United States Patent [19]

D'Antuono et al.

[11] Patent Number: 5,547,256
[45] Date of Patent: Aug. 20, 1996

[54] CHILD'S SEATING DEVICE

[76] Inventors: Robert A. D'Antuono, 45 Water St.; William J. Kirk, 327 Gilbert Stuart Dr., both of East Greenwich, R.I. 02818

[21] Appl. No.: 175,936

[22] Filed: Dec. 30, 1993

[51] Int. Cl.⁶ .................................................. A47C 1/035
[52] U.S. Cl. ............................ 297/377; 297/68; 280/642
[58] Field of Search ................... 297/68, 90, 91, 297/377, 354.12, 353, 354.1, 354.13, 71, 83, 84, 86, 16.1, 19, 30, 35, 39, 46, 354.13, 361.1, 373; 280/47.4, 642, 47.38, 650

[56] References Cited

U.S. PATENT DOCUMENTS

| | | | |
|---|---|---|---|
| 3,858,938 | 1/1975 | Kristensson et al. | 297/68 X |
| 4,412,688 | 11/1983 | Giordani | 280/47.4 X |
| 4,438,941 | 3/1984 | Guillaume | 280/47.4 |
| 4,451,082 | 5/1984 | Giordani | 297/68 X |
| 4,792,181 | 12/1988 | Guichon | 297/68 X |

FOREIGN PATENT DOCUMENTS 3333545  4/1985  Germany .............................. 297/47.4

*Primary Examiner*—Milton Nelson, Jr.
*Attorney, Agent, or Firm*—Robert J. Doherty

[57] ABSTRACT

An assembly for supporting children in various normal sitting and reclining positions in which separately movable seat, leg and back supporting sections are provided and wherein the leg and back sections are pivotally movable in unison with respect to the seat section such that the possibility of careless positioning of the supported child or infant is reduced.

6 Claims, 7 Drawing Sheets

5,547,256

CHILD'S SEATING DEVICE

BACKGROUND AND OBJECTS OF THE INVENTION

This invention pertains to supporting devices for infants, children and the like. Studies indicate that infant products should help the infant develop both physically and mentally and that the infant should be comfortable while active in such products. Also such products should be convenient for the care giver as well as be extremely safe.

The studies uncovered the fact that infants undergo an incredible series of changes in their first eighteen months of life. In the process, the inventors began to see that most infant products, no matter what price range, had major deficiencies associated with them with regard to proper infant development, comfort and safety and with regard to the convenience of the care giver. Indeed, many products on the market are actually bad for the development of the infant and some are downright dangerous. For example, a number of stroller related deaths have been reported to the U.S. Consumer Products Safety Commission.

The inventors have conceived of a novel mechanism to be used in a variety of infant products (strollers, swings, bouncers, high chairs, etc.). The mechanism gives the product the ability to recline into numerous positions with the trunk of the infant working in unison with the legs so that a proper and comfortable angle between the trunk, seat and legs are maintained at all times. In addition, the mechanism allows for the product to be folded (collapsed) into a small package.

The result is that the mechanism allows for infant development and/or greater comfort in the areas of spinal development, pelvis control and keeping the legs, seat and back in the proper relationship in all positions of recline.

Accordingly, these and other objects of the present invention are accomplished by the provision of a child's seating device comprising an outer frame for supporting a child supporting assembly comprising interconnected seat, leg rest and backrest portions, said frame including means for fixing the position of said seat relative to said frame in a generally longitudinally disposed use position, said seat including a relatively flat bottom member having opposed front and rear edges end a top surface which defines the generally horizontal plane in which said seat is disposed in said use position, both said leg rest and backrest portions each including a relatively flat panel pivotally interconnected to said seat bottom member proximal the front and rear edges thereof respectively at first and second operational angles with respect to said horizontal axis respectively, and a linkage assembly interconnecting and operative to simultaneously move said leg rest and said backrest in unison with respect to said seat about said bottom member pivotal interconnections such that the relationship between said first and second operational angles is essentially constant.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
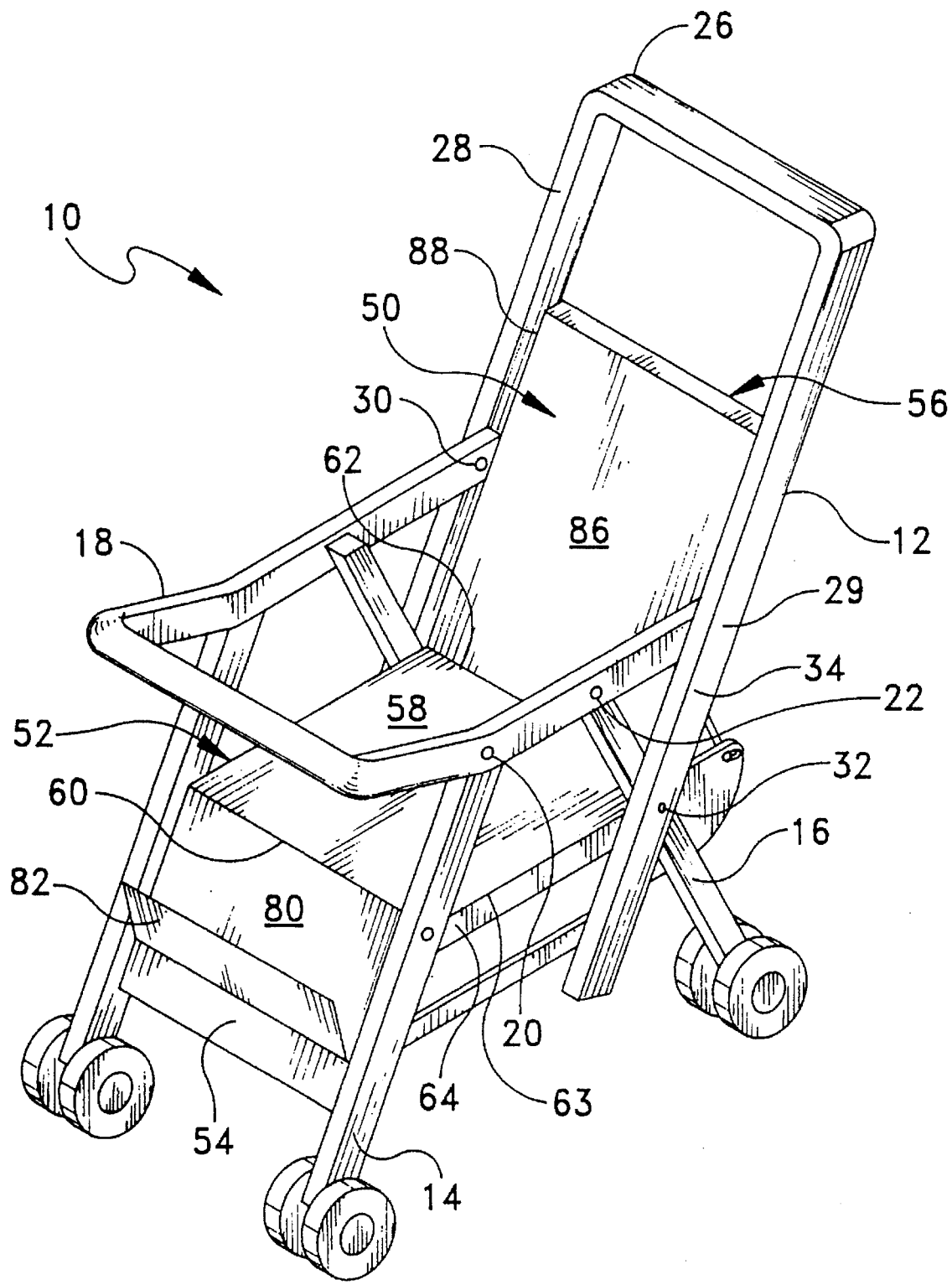
FIG. 1 is a perspective view showing a stroller in which the seating device of the present invention is incorporated.
Figure 2:
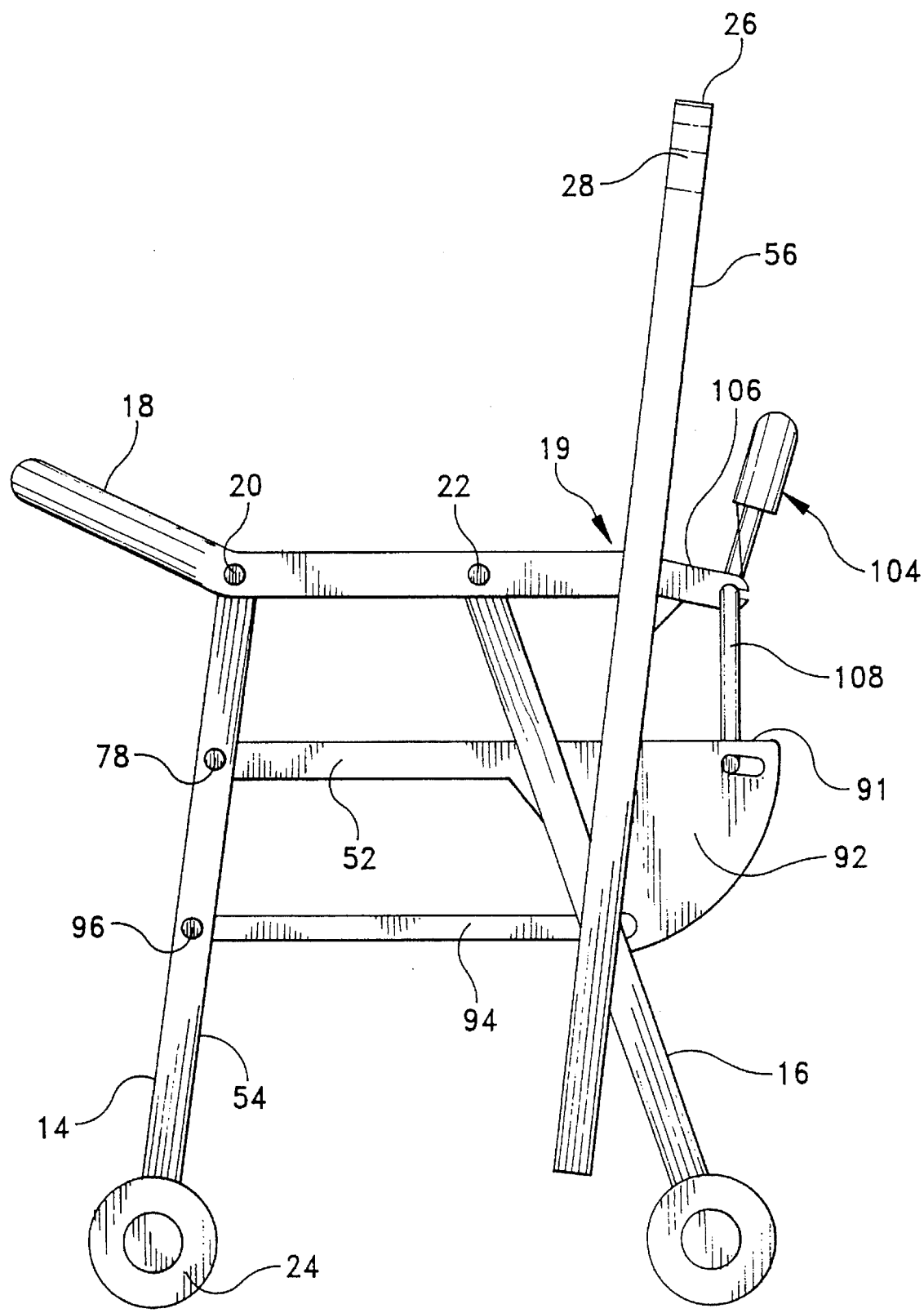
FIG. 2 is a side elevational view thereof in a use position.

Turning now to the drawings and particularly FIGS. 1 and 2 thereof, it will be apparent that the explanation of the present invention will be made in relationship to a stroller 10 although it should be brought out that the invention has utility with other devices such as swings, high chairs, bouncers, fixed seats and the like and that the explanation with specific regard to a collapsible stroller is not meant as a limiting aspect of the invention.

Figure 3:
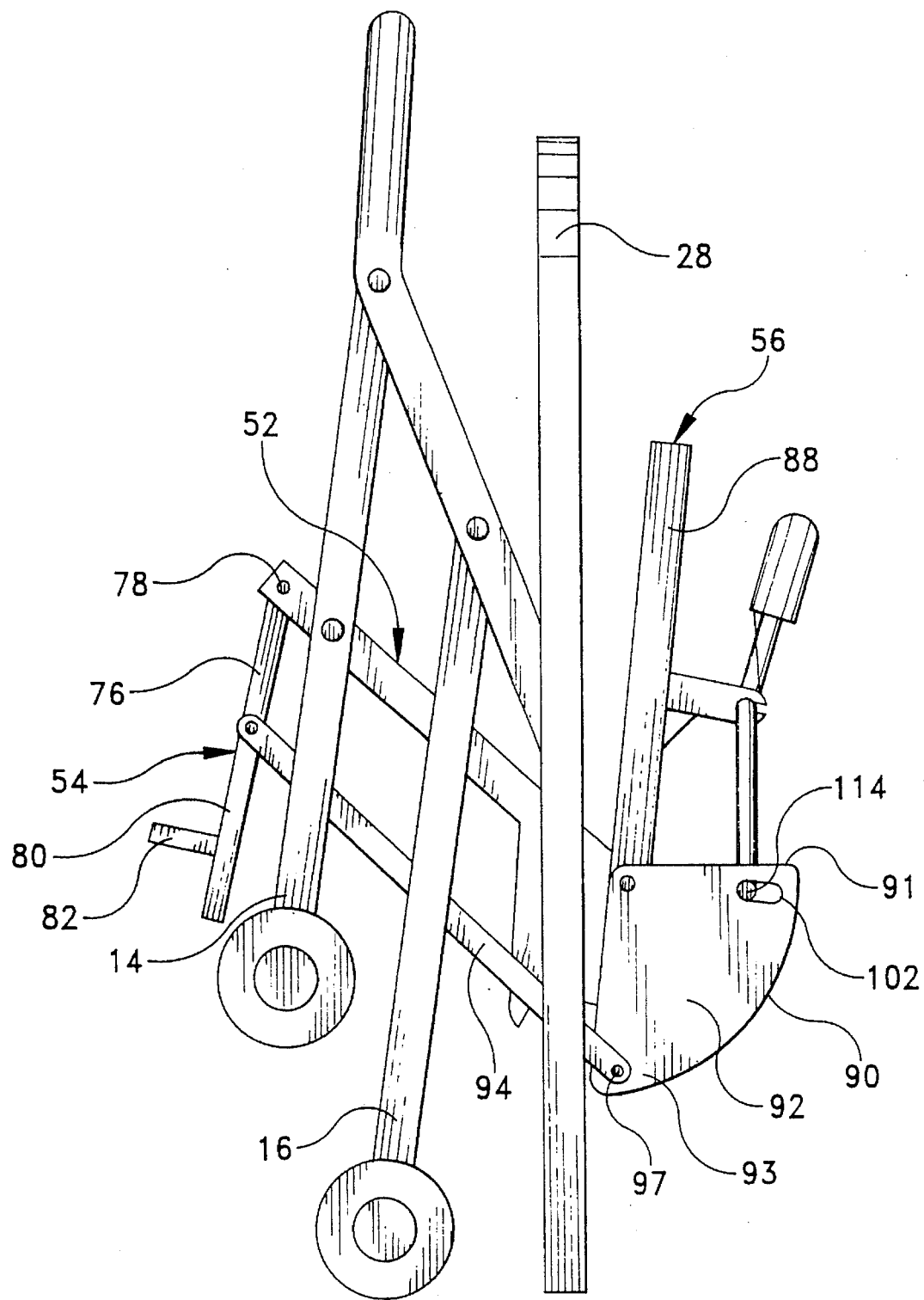
FIG. 3 is a side elevational view in the storage position.

The stroller 10 includes a frame 12 pictured in the upright use position in FIG. 2 and in a collapsed position in FIG. 3. Such frame includes a pair of generally U-shaped front and rear legs 14, 16 respectively which at their upper ends are pivotally connected to a generally U-shaped arm rest or retaining member 18 by laterally spaced connections 20 and 22 respectively. The arm rest is generally horizontally disposed in the use position and includes a rear portion 19 as shown in FIG. 2. The opposite ends of the legs 14, 16 are provided with wheels 24 for the support and movement of the stroller 10. In order to manipulate the stroller, a U-shaped bracket or handle 26 having a pair of downwardly extending arms 28 is connected to the rear arm segments 19 by pivotal connections 30.

Figure 4:
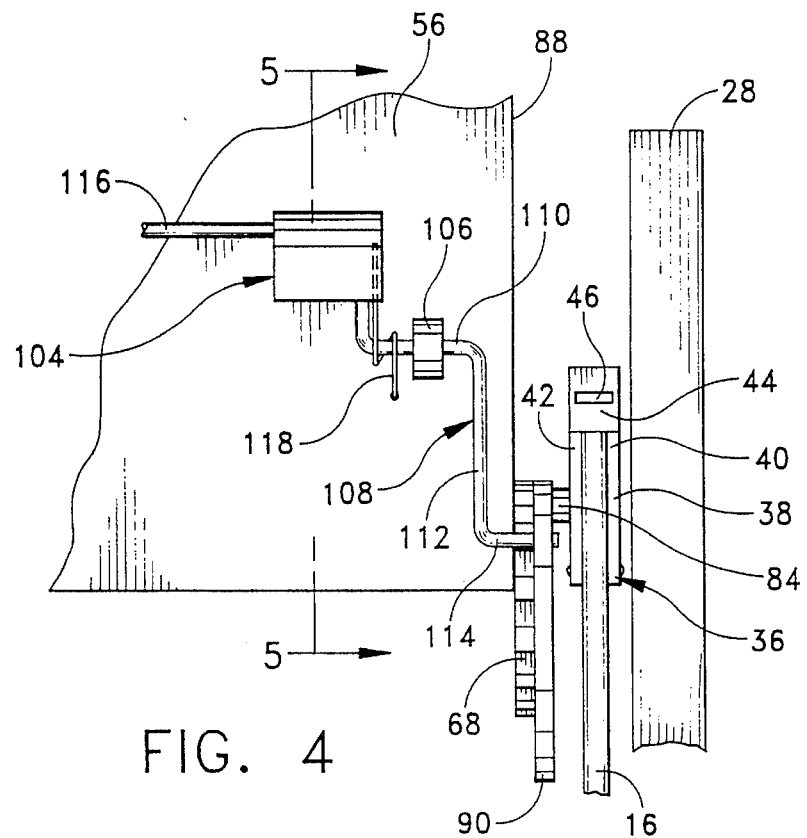
FIG. 4 is a partial rear view thereof.
Figure 5:
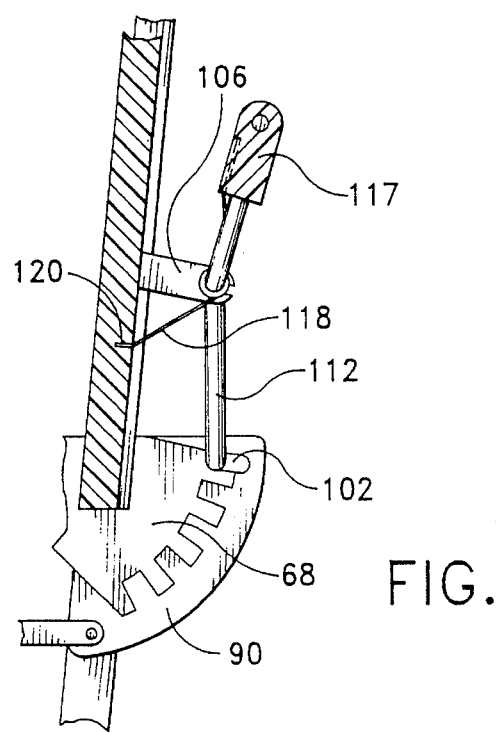
FIG. 5 is a sectional view through line 5—5 of FIG. 4 and shows In particular the spring mechanism which retains the controlling rod into a locked position.

The lower connecting segment 34 of the handle 26, that is, the portion that extends between the arm rest and the rear legs 16, includes a locking assembly 36 (omitted except in FIG. 4 for clarity) such that the segment 34 may be temporarily fixed in position to, in effect, lock the stroller in the upright use position as shown in FIG. 2. When it is desired to collapse the stroller, the locking means 36 may be released and then the front and rear legs 14, 16 along with the arm segments 19 and the handle moved towards each other in the essentially collapsed or storage position as shown in FIG. 3. The locking assembly may take any form but an appropriate structure is shown in FIG. 4 wherein a pair of wing-shaped brace elements 38 are positioned on either side of the rear legs 16 and connected thereto at their lower ends by means of the pivot connection 32. The upper ends 40 of the wings 38 include upwardly extending fingers 42 which are adapted to be received in a sprang actuated keeper member 44 which in turn has a rearwardly extending finger rest or shelf 46 provided thereon such that the operator can upwardly lift the keeper member and thus release the locking mechanism so that the entire device can be collapsed as previously mentioned. It should be pointed out that any locking mechanism suitable for the overall purposes of the stroller, chair, bouncer or other device in which the subject assembly of the present invention could also be utilized.

Such assembly 50 includes interconnected seat, leg rest and backrest portions 52, 54 and 56 respectively. Generally, the seat includes a relatively flat bottom member 58 having opposed front and rear edges 60 and 62 respectively. The opposed sides 63 of the seat bottom 58 are generally provided with integral or otherwise securely attached vertically oriented flanges 64 for ease in attaching other elements thereto. In any event, the seat bottom sides include a pair of elongated forwardly disposed arms 66 each terminating in a rear quadrant or plate 68 which in turn at its lower rear surface 70 thereof is provided with a plurality of notches 72 and a stop 74 for a purpose which will hereinafter be more fully explained. The side member flanges 64 form a convenient means through which the frame 12 of the stroller may be connected to the seat assembly 50 such that when the locking means 36 is engaged it will fix the relative position of the frame 12 with respect to the seat 52.

The leg rest 54 is pivotally attached to the front edge 60 of the seat 52 via a rod 78 which extends through the forward portions of the side flange 76 to which the leg rest itself is fixedly connected. The leg rest includes a generally flat upper surface 80 from which a vertical footrest 82 extends. Similarly, the backrest is pivotally connected to the rear edge 62 of the seat by a pair of pins 84 which extend into the backrest through the fixed quadrant or plate 68 of the seat bottom on either side of the backrest. The backrest includes a generally flat central member 86 and a pair of side flanges 88 in turn through which such pins 84 may conveniently pass. The upper surfaces of the backrest, seat bottom and leg rest may be conveniently provided with a continuous or discontinuous layer of padding or cushioning, etc. such that the child may assume a normal seated or reclining position with the bottom part of its body resting on the seat portion, its legs extending and supported by the leg rest and its back and head supported by the backrest.

In addition to the fixed quadrant or plate 68 attached to the seat 52, a movable plate 90 is also attached to the backrest 56 via the pins 84 at each side of the lower backrest portion. Such plates 90 include a somewhat arcuate body 92 which is provided at its forward end 93 with a bottom linkage arm 94 connected thereto by pins 97. The arm 94 extends forwardly and is connected with the leg rest side flanges by linkage pivot pins 96. It should be brought out that the vertical distance between the linkage pivot 96 and the seat bottom leg rest pivot and between the rear linkage pivot and the seat bottom backrest pivot are approximately the same distance such that the linkage arm, the seat bottom, the forward portion of the plate 90 and the upper portion of the leg rest, in essence, form a parallelogram such that limited rotational movement of the plate 90 will cause a similar and approximately equal angular movement of the leg rest via the linkage arm and in this manner maintain a generally expected and safe three-piece supporting surface for the child being conveyed or otherwise restricted. The movement of the plate 90 is normally and easily accomplished by movement of the backrest since this is a logical portion of the assembly to grasp and because of its inherent movement arm.

Figure 6:
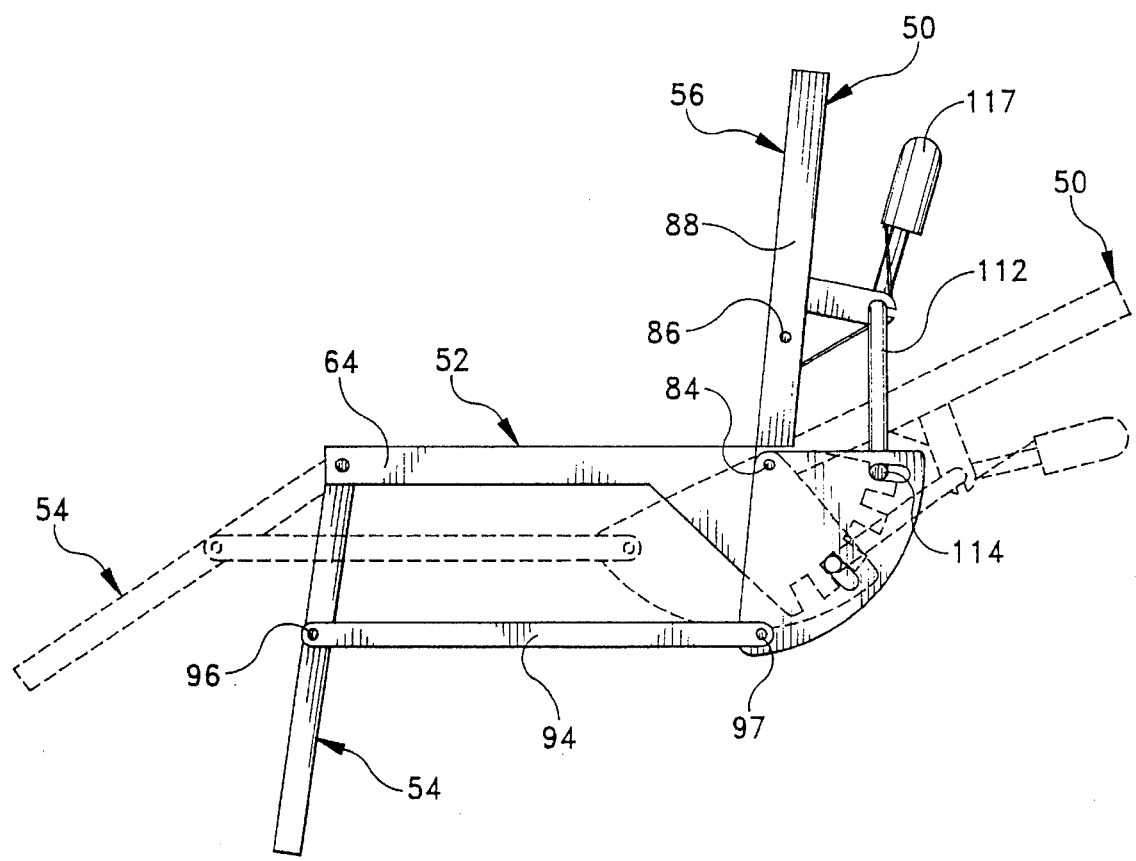
FIG. 6 is a side sectional view on an enlarged scale and in stylization representation showing the overall relationship of the various essential operative parts of the present invention.

The rear of the plate 90 proximal to its upper edge 91 includes an elongated slot 102 preferably closed but alternatively open to its outer edge for receipt of the terminal portions of a controlling or positioning mechanism 104. Such mechanism 104 includes a pair of combination pivot and retaining ears 106 which extend rearwardly from the bottom of the backrest and preferably a pair of control rods 108 although a single rod in some cases can suffice in which case only one set of face to face plates 68, 90 would be present. The rods 108 include a central inwardly directed portion 110 which is journaled in the spaced ears 106 from which a downwardly extending arm portion 112 extends and terminates in an outwardly extending finger 114. The finger is adapted in turn to extend through one of the notches 72 of the fixed plate 68 and thence into the confines of the slot 102. It should be pointed that the slot 102 extends a longitudinal distance past the outer extent of the lower edge of the fixed plate 68 in which the notches 72 are provided a distance at least equal to and preferably slightly greater than the thickness of the control rod fingers 114. In this manner then when the control rod 108 is in the position as shown in FIG. 6, the fixed and moving plates are locked in relationship to each other which in turn fixes the position of the backrest and footrest portions of the seat assembly vis-a-vis the seat bottom. When it is desired to move the movable plate 90 with respect to the fixed plate 68, the upper part 116 of the control rod 108 is moved towards the backrest by pressing on thumb or finger pads 117 which causes the arm portion 112 to move to the right as shown in FIG. 6 a distance sufficient to disengage with one of the notches and then be moved to any of the other desired positions as shown by the various notches by the user's manipulation or positioning of the backrest. A tension spring 118 in the form of a wire is connected to the back of the backrest at connection point 120 and then is adapted to pass over the central portion 110 of the rods and thence into pad 117 and thus biases the connecting rod to the position shown in FIG. 6. Other biasing mechanisms, of course, can be substituted for the wire. The uppermost notch 72 of the fixed plate 68 is in the form of a step 74 against which the fingers 114 rest in the most upright of the backrest positions and in such position the seat assembly 50 is free to collapse upwardly along with the frame 12 to the storage position shown in FIG. 3. Otherwise, the locking fingers 114 would have to be separately released prior to the collapsing movement.

It will thus be apparent that a simple, straightforward and yet effective device has been disclosed which accomplishes the purposes of the present invention. Accordingly by controlling the movement of the system such that the backrest and leg rest recline in unison, the child can always be maintained in a proper relationship regardless of the number of backrest and leg rest positions that are permitted. This insures that a careless care provider cannot force the child to assume an undesirable or contorted position. In addition, the aforementioned relationship of the seat bottom to the backrest and footrest portions of the assembly enables it to be easily collapsed simply by folding the frame 12 to the position shown in FIG. 3. In other words, the child supporting assembly is adapted for a disengagement from the frame for free pivotal rotation about the seat bottom portion thereof when collapsing is desired. In addition, the present device enables the footrest and headrest sections to be disposed with respect to the seat rest such that a nearly flat composite attitude is achieved. Obviously, the child supporting portion of the device could also be separately removed from such a frame.

Figure 7:
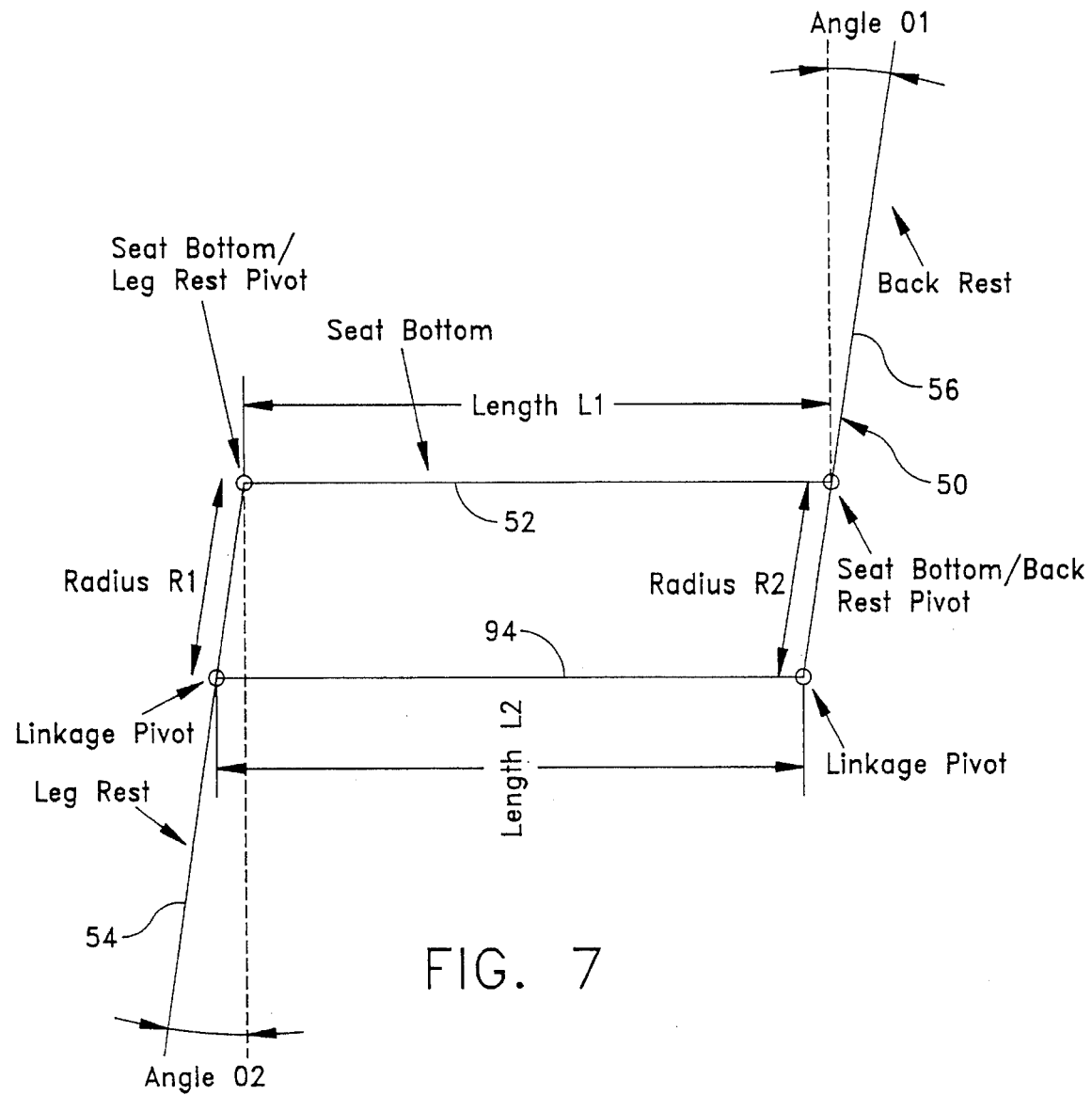
FIG. 7 is a diagram explaining the linkage relationship illustrated by FIG. 6.
Figure 8:
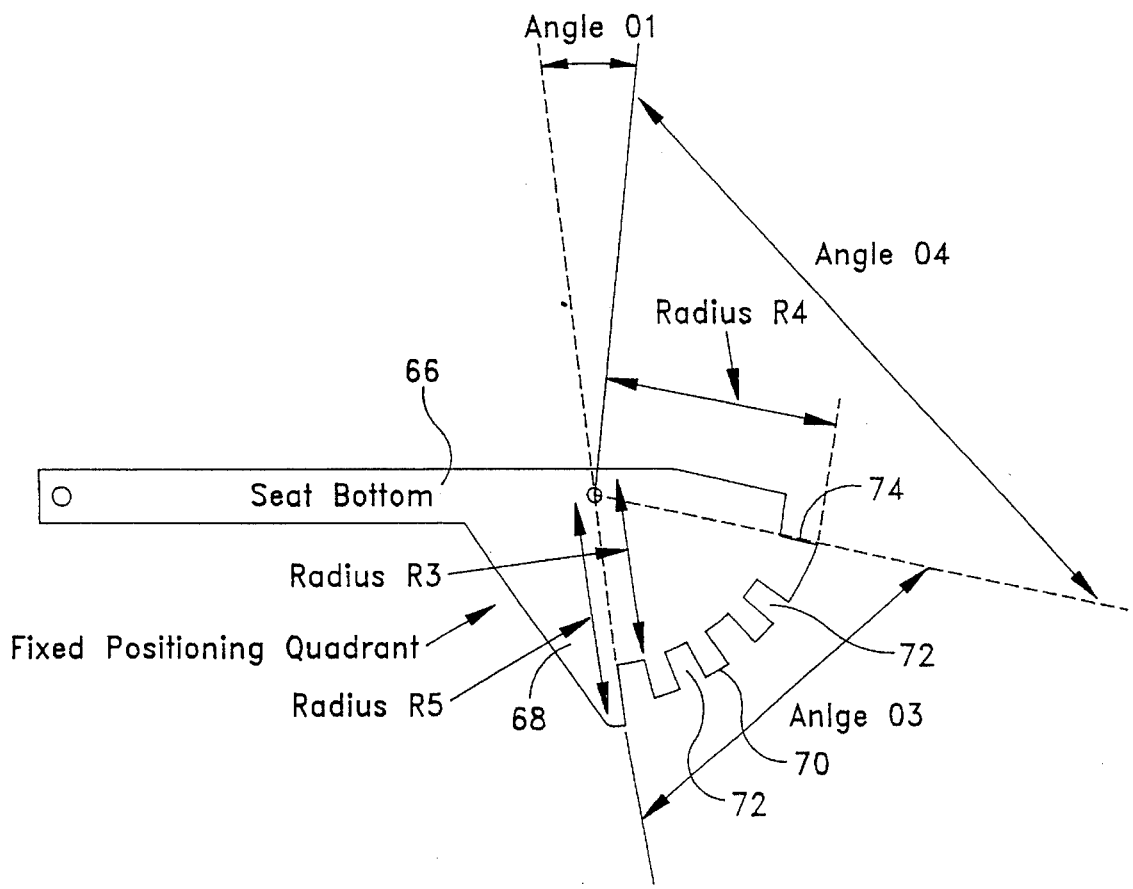
FIG. 8 is a stylized representation of the seat bottom showing the fixed positioning quadrant portion of the device and illustrates various positioning variations thereof.

Further specific linkage and positioning data is hereinafter set forth with respect to FIGS. 7 and 8. With respect to FIG. 7:

1. The angle $\phi 1$ is the position of most vertical position for the backrest;
2. The angle $\phi 1$ and $\phi 2$ should be the same such that the infant's legs are disposed at the same angle to vertical as is the infant's back; and 3. The lengths L1 and L2 should be equal to each other as should the radia R1 and R2 in order to maintain the desired same angular relationship between the backrest and the leg rest.

With regard to the positioning data with respect to the relatively fixed plate 68 shown in FIG.

1. The angle $\phi 3$ determines the amount of recline of the mechanism. As the $\phi 3$ approaches 90 degrees, the mechanism will tend to lock up and not function properly;
2. Angle $\phi 3=(90-\phi 1)$ degrees in order to achieve an essentially flat fully reclined position;
3. The angle $\phi 4$ determines the distance between the position of the seat back and the uppermost vertical positioning slot (an open slot or step);
4. The angle $\phi 4$ is a non critical angle ranging anywhere from 0 degrees to 90 degrees depending on this product designers requirements. The larger the angle, the more difficult the controlling rod mechanism would be to design. At $\phi 4=0$ degrees, the fixed quadrant is located such that an UP and Down movement of the controlling rods along the seat back would be required. As $\phi 4$ increases, the controlling motion becomes more and more angular:
5. Radius R3 determines the basic size of the quadrant and therefore the practical number of positioning slots which can be incorporated. Larger R3's allow more positioning slots;
6. Radius R4 determines the amount of leverage which can be applied to rotate the mechanism when the end product is loaded down by the infant. (R4-R3) determines the movement of the controlling rods;
7. Radius R5 is the end stop in the fully reclined position and determines the angle $\phi 3$. R5 needs to be greater than R4 in order to stop the control rods from extending the unit beyond the fully reclined position: and
8. The length of the closed ended slot In the moving quadrant should not exceed the R5-R3 so that the controlling rods cannot get outside of the system constraints.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A child's seating device comprising an outer frame and a child supporting assembly comprising interconnected seat, leg rest and backrest portions, said frame supporting said child supporting assembly and including means for fixing the position of said seat portion relative to said frame in a generally longitudinally disposed use position, said seat portion including a relatively flat bottom member having opposed front and rear edges and a top surface which defines a generally horizontal plane in which said seat portion is disposed in said use position, both said leg rest and backrest portions each including a relatively flat panel pivotally interconnected to said seat portion bottom member proximal the front and rear edges thereof respectively at first and second operational angles with respect to said horizontal plane, and a linkage assembly operative to simultaneously move said leg rest portion and said backrest portion in unison with respect to said seat portion about said bottom member pivotal interconnections such that said first and second operational angles are essentially equal to each other, including means for holding said linkage assembly in a fixed position so that said leg rest and backrest portions are fixed relative to said seat portion, both said frame and said child supporting assembly being vertically and simultaneously collapsible, said linkage assembly holding means including a first plate rearwardly extending from said seat portion and a second plate downwardly extending from said backrest portion such that the plates are in face to face operational relation, said second plate arcuately movable across portions of said first plate upon movement of said backrest portion and means for locking said plates in varying relative positions with respect to each other.

2. The device of claim 1, said first and second plates each outwardly terminating in an arcuate surface wherein said arcuate surfaces are essentially coextensive and wherein said second plate is pivotally connected to said first plate at its circular center, a first rigid linkage arm pivotally attached at one end to said movable second plate at a first radial distance from said center and at its other end to said leg rest portion, thereby defining a distance equal to said first radial distance away from the pivotal connection of said leg rest portion to said seat portion such that the leg rest portion moves in angular unison with said backrest portion.

3. The device of claim 1, said locking means being a transverse slot in said first plate and a plurality of peripheral notches on said second plate and a finger extending through said slot and into one of said notches and means for moving said finger into and out of contact with said notches.

4. The device of claim 3, said backrest portion having opposed front and rear surfaces with the front surface providing the support of the child, said locking means further including an elongated rod having opposed upper and lower ends and a central portion and pivotally supported at said central portion to said backrest portion rear surface, said lower rod end terminating in a transverse segment forming said locking finger.

5. The device of claim 4, said rod being spring biased to a locked position wherein said finger is engaged with one of said notches.

6. The device of claim 4, an uppermost of said notches being a step such that the locking means rod does not have to be activated to move said second plate upwardly with respect to said first plate.

* * * * *